United States Patent [19]

Shepherd

[11] Patent Number: 4,622,833
[45] Date of Patent: Nov. 18, 1986

[54] VEHICLE WHEEL LOCK

[76] Inventor: Richard L. Shepherd, P.O. Box 5832, Pasadena, Tex. 77505

[21] Appl. No.: 648,981

[22] Filed: Sep. 10, 1984

[51] Int. Cl.⁴ .............................................. B60R 25/00
[52] U.S. Cl. ...................................................... 70/226
[58] Field of Search ................. 70/226, 225, 227, 228, 70/181, 233, 236, 237; 180/275, 287

[56] References Cited

U.S. PATENT DOCUMENTS

| | | | |
|---|---|---|---|
| 1,158,891 | 11/1915 | Braun | 70/226 |
| 1,428,236 | 9/1922 | Jones | 70/226 |
| 4,034,824 | 7/1977 | Lucas | 70/226 |

*Primary Examiner*—Robert L. Wolfe

[57] ABSTRACT

An anti-theft system which employs a pin member to releasably lock a vehicle wheel to the vehicle frame which can be accomplished manually or by remote control.

5 Claims, 7 Drawing Figures

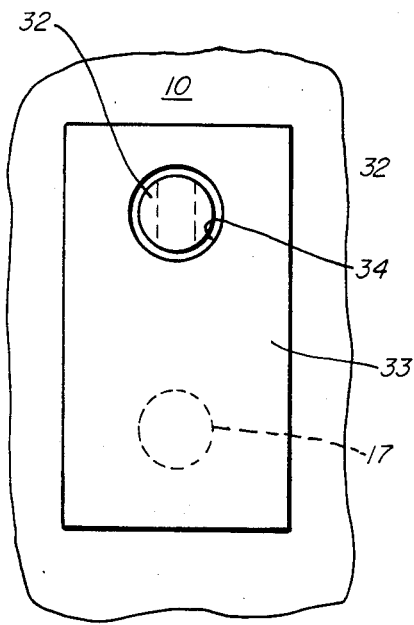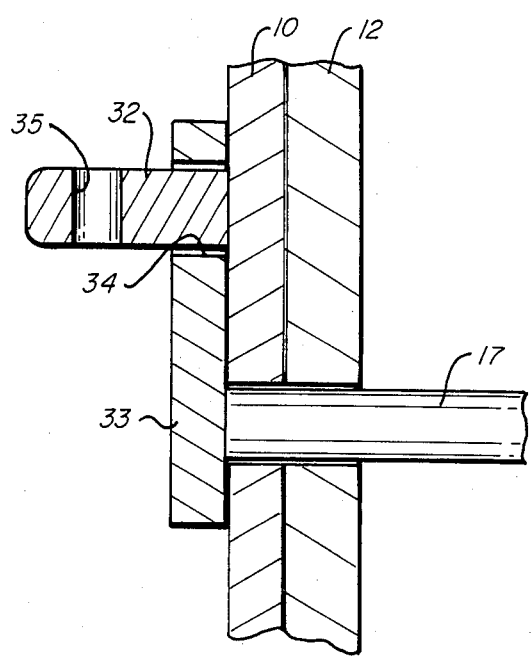
FIG. 4A
FIG. 4B
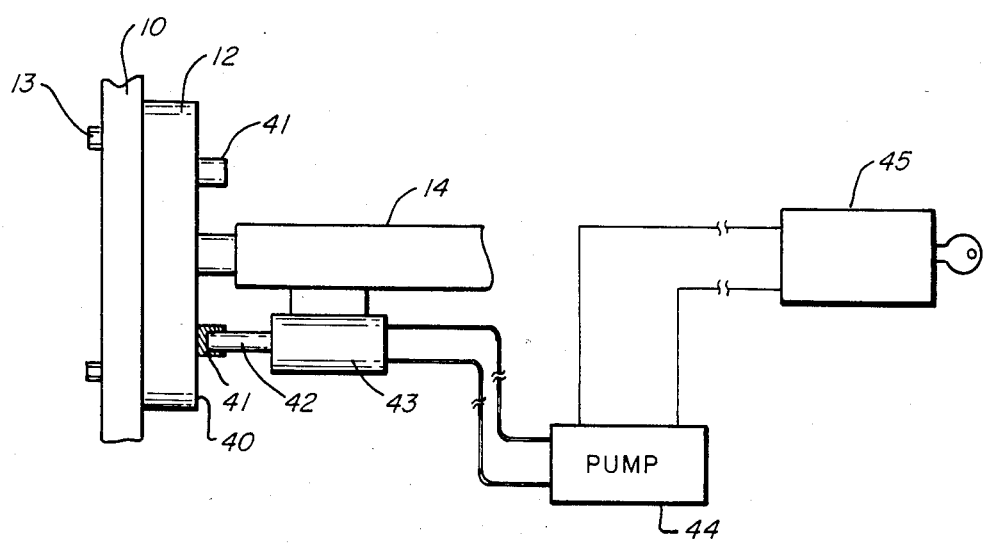
FIG. 5

VEHICLE WHEEL LOCK

FIELD OF THE INVENTION

The present invention relates to anti-theft systems for vehicles and more particularly to a mechanical locking system to lock a wheel rim relative to a vehicle frame. It is well known that the theft of vehicles is a common occurrence and there having been developed many devices and systems for deterring theft. Most devices are electronic, siren type systems. The anti-theft devices serve as a warning or alarm by providing an audible noise as a deterrent. The devices typically are related to discontinuity in an electrical function of the vehicle. However, there is a need for a positive mechanical system which is simple, inexpensive and readily adaptable to vehicles for preventing theft.

THE PRESENT INVENTION

The present invention involves a first mechanical locking means which is permanently attached to a wheel axle and cooperates with a second, mechanical locking means. The second locking means is releasably cooperative with a wheel rim and the first locking means on the axle to lock relative movement of the wheel rim relative to the vehicle axle.

The apparatus of the present invention utilizes a tube member with a locking bore which is permanently attached to the axle of a vehicle so that a stainless steel pin, when inserted through a bore in the wheel rim and into the tube member, provides an interlocking relationship of the wheel rim and vehicle axle. The pin is capable of being releasably locked relative to one of the tube members.

In another embodiment, a locking pin is remotely controlled to releasably lock with respect to a locking device on the wheel rim.

In the drawing:

FIGS. 4A and 4B illustrate another form of the invention; and

FIG. 5 illustrates another embodiment of the invention on a tire axle and rim.

The invention may best be understood by reference to the drawings and the description and claims which follow.

DESCRIPTION OF THE PRESENT INVENTION

Figure 1:
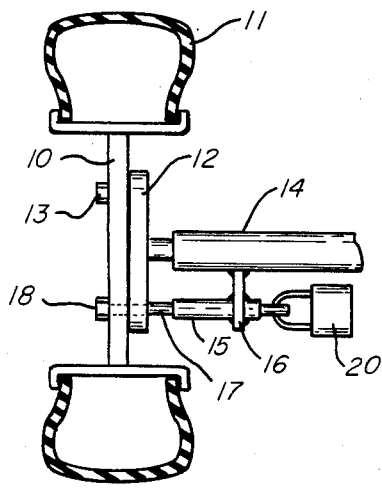
FIG. 1 illustrates schematically a wheel rim and tire on wheel axle with one embodiment of the present invention.

Referring now to FIG. 1, a tire rim or wheel rim 10 receives a tire member 11. The wheel rim is attached to an annular axle flange 12 by five bolt members, 13 equally distantly spaced about the tire rim. The bolt members 13 pass through sized openings in the wheel rim and are threadedly received in the annular axle flange 12 to secure the wheel rim to the axle flange 12. The annular axle flange 12 is, in turn, rotatably mounted in an axle housing 14 which is attached to a vehicle body (not shown).

As shown in FIG. 1, a tubular member 15 is permanently attached to axle housing 14 by a plate member 16 which is welded to the axle housing and the tubular member 15. The opening of the tubular member 15 has its central axis extending through the wheel rim member 10 to intersect a circle which is defined by the radius between the center of a bolt member 13 and the axis of rotation for the wheel rim. One of the bolt members is removed and a hole drilled through the flange 12 so that a stainless steel pin member 17 with a flanged head 18 can be inserted through the bolt opening in the wheel rim. The opening in the flange 12 is alignable with the bore of the tubular member 15 attached to the axle housing 14. The pin member 17 has a length which extends the end of the pin member beyond the tubular member 15 so that a lock 20 may be inserted through an opening in the pin member 17 and releasably hold the pin in a fixed position. Thus, the pin member serves to releasably lock the wheel rim relative to the axle.

Figure 2:
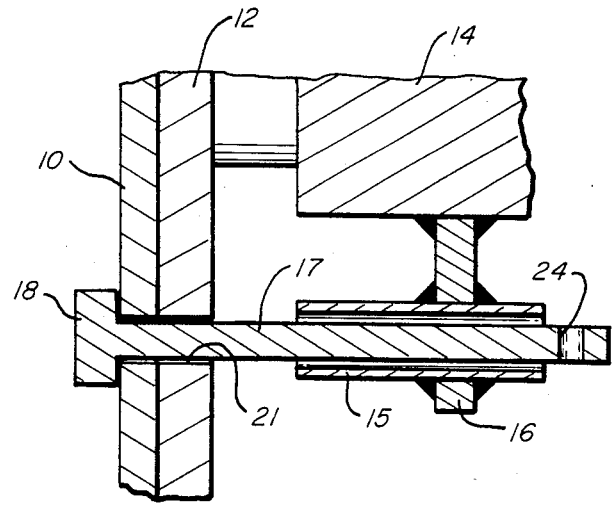
FIG. 2 illustrates in partial cross section the detail of the embodiment of FIG. 1.

FIG. 2 illustrates in greater detail, a portion of the wheel rim 10 and an axle flange 12 with aligned openings 21 where the axis of the openings 21 in the axle flange and wheel rim align with the axis of a tubular member 15 which is permanently attached to the axle housing 14 by the plate member 16. The attachment of the tubular member 15 to the axle housing is accomplished by the plate member 16 which has an opening to receive a stainless steel tube member 15 and is welded to the tubular member and to the axle housing. The interlocking pin member 17 has a bolt head 18 which provides a stop with respect to the wheel rim. The pin member 17 extends through the wheel rim 10 and the flange 12 and through the bore of the tubular member 15 so that a transverse lock opening 24 in the pin member 17 is disposed beyond the end of the tubular member thereby permitting a lock to be attached.

Figure 3A:
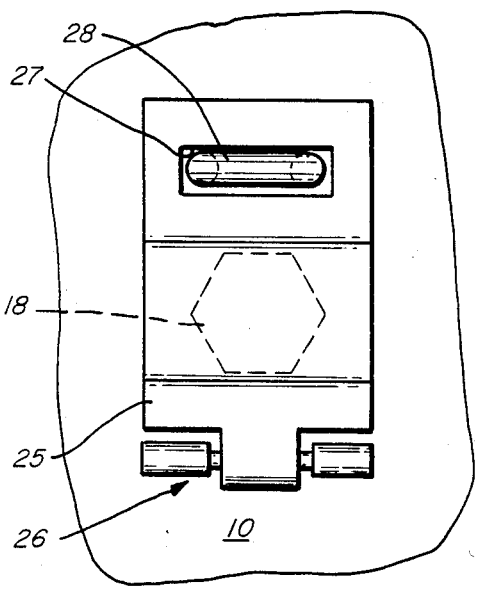
FIGS. 3A and 3B illustrate another form of the invention.
Figure 3B:
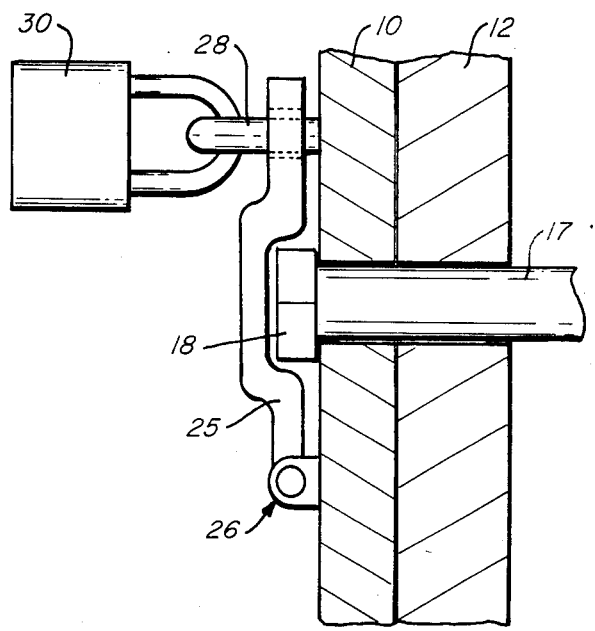

As shown in FIGS. 3A and 3B, instead of utilizing a lock at one of the pin member 17, a U-shaped clasp member 25 which is pivotally coupled at 26 to the wheel rim 10 is sized to fit over the flat surface of a hexagonical or square shaped bolt head 18 with the clasp member having an opening 27 to receive a U-shaped locking pin 28. When the opening of the clasp member 25 is in place, it prevents the bolthead 18 from rotating and from being removed by use of a lock 30 inserted through the locking pin 28. The lock 30 releasably locks the bolt head 18 in position when the pin member 17 is disposed in the tubular member 15 which is permanently attached to an axle. While not as satisfactory, in the embodiment of FIGS. 3A and 3B need not require interfilling of the pin member 17 with the bore of the wheel since there will be an interference of the rotation of the wheel by virtue of engagement of the pin member 17 with the tubular member 15.

Referring now to FIGS. 4A and 4B, a pin member 32 can be perpendicularly and permanently attached to the wheel rim 10 by welding or the like. A locking plate member 33 with an elongated head portion having an opening 34 is provided so that the pin member 17 can be inserted through the openings 21 in the wheel rim 10 and flange 12 and into the tube member 15 while the opening 34 in the elongated head portion receives the locking pin 32 on the wheel rim. Thereafter, a lock member (not shown) may be inserted through an opening 35 in the locking pin 32 to lock the flange to the wheel rim 10.

The foregoing description of the present invention has concerned itself principally with vehicles which do not employ hubcaps such as trailers and the like where there is reasonable access to the opening in the wheel rim to insert the locking pin through the rim opening and into the tube member. Obviously, if more than one wheel is to be locked on the vehicle then the locking systems must be installed so that alignment of one wheel produces simultaneous alignment of the other wheels on the vehicle. It is preferable to make the locking housing and locking pin out of a hard metal such as stainless steel or the like which would resist attempts to sever the pin member by sawing or the like. While a bolt opening in the flange 12 is convenient to drill out, the opening through the wheel rim and flange may be at any desired location.

For vehicles which employ hubcaps, in the FIG. 5, the inside surface 40 of the wheel flange is provided with a first locking means which can be, for example, one or more projections on the flange or transverse plate members 41 attached to the flange so as to provide a barrier or stop. The second locking means includes a locking pin 42 which is slidably received in a housing 43 which is permanently attached to the axle 14. The locking pin is reciprocated by a piston and cylinder in the housing 43. The piston and cylinder are coupled to a pump 44 and the ignition system 45 so that the turning off of the ignition system actuates a piston to move the locking pin 42 into an interference position relative to a plate member 41 on the flange so that rotation of the wheel is limited. Thereafter, when the ignition system is initiated to the start position, the pump is reversed to move the locking pin 42 out of interference with respect to a plate member 41. Thus, the system automatically locks with operation of the ignition system. Obviously, the control need not be keyed to the ignition system and can be an independent system. Also, electrical solenoids can be employed to operate the locking pin 42.

In operation, the systems serve to mechanically interlock a wheel rim to a vehicle body by use of a pin member which is utilized to releasably couple a wheel rim to a vehicle body.

It will be apparent to those skilled in the art that various changes may be made in the invention without departing from the spirit and scope thereof and therefore the invention is not limited by that which is enclosed in the drawings and specifications, but only as indicated in the appended claims.

What is claimed is:

1. A locking mechanism for use in wheel supported vehicles comprising:
    at least one set of wheel members mounted for rotation on a support axle for a vehicle;
    chassis means for a vehicle supported on said support axle;
    means for interlocking at least one of said wheel members to said support axle including first locking means fixedly attached to said support axle, said first locking means being defined by an elongated member having an elongated opening therethrough, second locking means including an elongated locking member and an opening through said wheel member, said opening being alignable with said elongated opening in said elongated member in a locking position where said elongated locking member can be received in said opening and said elongated opening for providing an interlock which prevents rotation of said wheel member relative to said support axle while said second locking means is in a cooperating relationship, said elongated member being insertable through the opening in said wheel member on the side of the wheel member away from the support axle.

2. A locking mechanism for use in wheel supported vehicles comprising:
    at least one set of wheel members mounted for rotation on a support axle for a vehicle;
    chassis means for a vehicle supported on said support axle;
    means for interlocking at least one of said wheel members to said support axle including first locking means fixedly attached to said support axle, said first locking means including a tubular member, second locking means including a pin member slidable receivable in said tubular member and sized to pass through an opening in said wheel member for providing an interlock which prevents rotation of said wheel member relative to said support axle while said pin member is in a cooperating relationship and wherein movement of said pin member from the cooperating relationship releases the interlock of the wheel member relative to said support axle, said pin member having a head member to abut against the said wheel member and a length sufficient to extend beyond the tubular member and wherein the end projecting beyond the tubular member has means for affixing a releasable lock means for releasably preventing removal of said pin member from said tubular member.

3. The locking mechanism as defined in claim 1 wherein the pin member has a head member to abut against said wheel member and there are means on said wheel member for releasably locking said pin member relative to said wheel member.

4. The locking mechanism as defined in claim 3 wherein said means for releasably locking said pin member relative to said wheel member includes cover means for preventing removal of said pin member.

5. The locking mechanism as defined in claim 3 wherein said means for releasably locking said pin member relative to said wheel member includes a pin member on said wheel member and cooperating means on said wheel member for preventing removal of said pin member.

* * * * *